(12) United States Patent   (10) Patent No.: US 6,587,762 B1
Rooney                       (45) Date of Patent:    Jul. 1, 2003

(54) AUTOMATIC GUIDANCE UNIT FOR AERIAL DELIVERY UNIT

(75) Inventor: Harry B. Rooney, Laguna Hills, CA (US)

(73) Assignee: FXC Corporation, Santa Ana, CA (US)

( * ) Notice: Subject to any disclaimer, the term of this patent is extended or adjusted under 35 U.S.C. 154(b) by 33 days.

(21) Appl. No.: 09/928,222

(22) Filed: Aug. 10, 2001

Related U.S. Application Data

(60) Provisional application No. 60/226,423, filed on Aug. 18, 2000.

(51) Int. Cl.$^7$ .............................. G06F 19/00; G06G 7/78
(52) U.S. Cl. .............................. 701/16; 701/4; 701/207; 244/164; 244/152; 244/35 R; 235/375; 342/357.08; 342/357.06; 710/21-23; 340/996
(58) Field of Search ........................... 701/3, 4, 11, 16, 701/201, 202, 207, 213, 217, 220; 235/375; 342/386, 357.08, 465, 357.06; 244/139, 3.1, 13, 164, 171, 35 R, 76 R, 152; 710/100, 21–23; 379/93.06, 357; 340/5.65, 996; 361/807, 809; 73/2, 200

(56) References Cited

U.S. PATENT DOCUMENTS

| 4,424,945 A |   | 1/1984  | Dell .............................. 244/13 |
| 4,436,993 A | * | 3/1984  | Flies ............................. 235/382 |
| 4,578,573 A |   | 3/1986  | Flies et al. .................... 235/492 |
| 4,678,145 A |   | 7/1987  | Buehrer et al. ............... 244/152 |
| 5,149,945 A | * | 9/1992  | Johnson et al. ............... 235/380 |
| 5,201,482 A |   | 4/1993  | Ream .......................... 244/145 |
| 5,473,690 A | * | 12/1995 | Grimonprez et al. ......... 705/66 |
| 5,678,784 A |   | 10/1997 | Marshal, Jr. et al. .......... 246/2 |
| 5,899,415 A |   | 5/1999  | Conway et al. .............. 244/152 |
| 6,056,237 A | * | 5/2000  | Woodland .................. 244/3.15 |
| 6,135,387 A | * | 10/2000 | Seidel et al. ................ 244/3.15 |
| 6,144,899 A | * | 11/2000 | Babb et al. ..................... 701/3 |
| 6,220,168 B1 | * | 4/2001  | Woodall et al. ............. 102/411 |
| 6,293,202 B1 | * | 9/2001  | Woodall et al. ............. 102/387 |
| 6,343,244 B1 | * | 1/2002  | Yoneda et al. ................. 701/3 |
| 2002/0100809 A1 | * | 8/2002 | Lu .............................. 235/492 |

OTHER PUBLICATIONS

Brochure "Pegasus APADS—Advanced Precision Aerial Delivery System"—Approximately 1991.

* cited by examiner

Primary Examiner—Thomas G. Black
Assistant Examiner—Ronnie Mancho
(74) Attorney, Agent, or Firm—Knobbe, Martens, Olson & Bear LLP

(57) ABSTRACT

Methods and systems for programming the automatic guidance unit of an aerial delivery system. The operator selects on a hand-held unit the desired flight parameters such as the latitude, longitude and altitude of the desired landing site, as well as the desired landing heading and default heading. A microprocessor converts this data into digital data that is stored on a removable EEPROM memory key. This key is then removed from the hand-held unit and at any convenient time, inserted into a mating female receptacle in the automatic guidance unit of the aerial delivery system. The programmed information originally entered in the hand-held unit is then transferred into the guidance unit of the aerial delivery system.

12 Claims, 21 Drawing Sheets

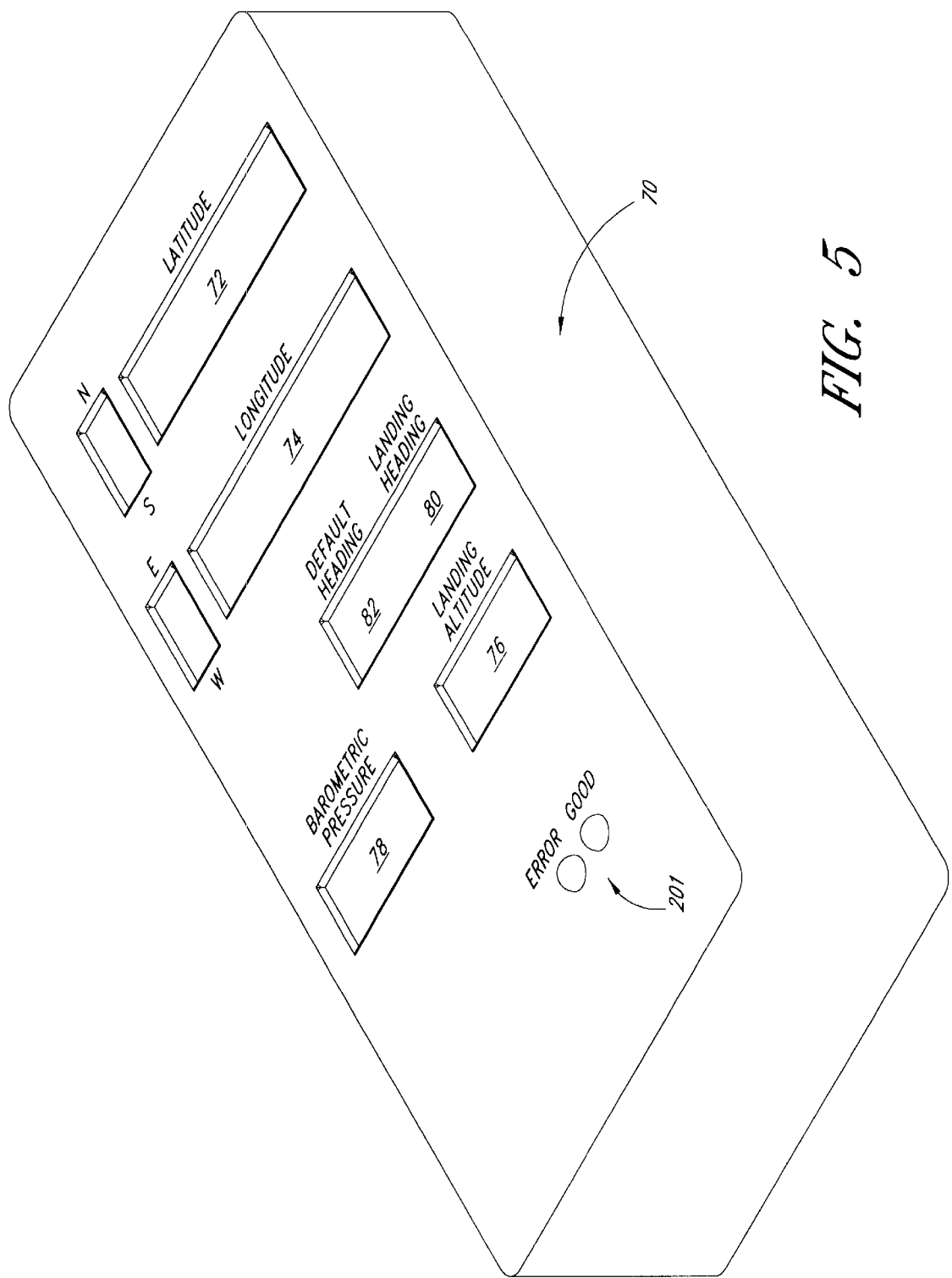

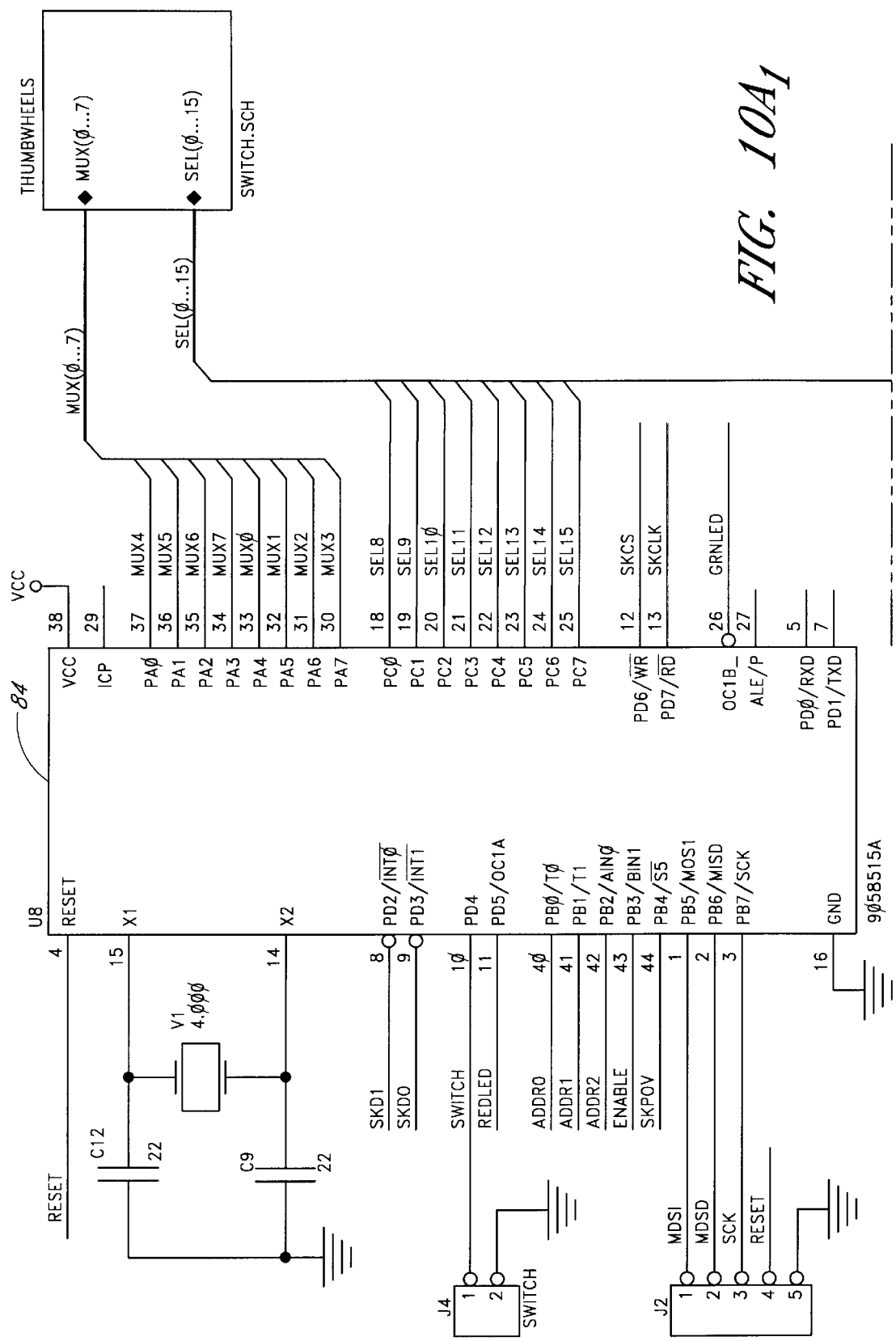
FIG. 10A₁

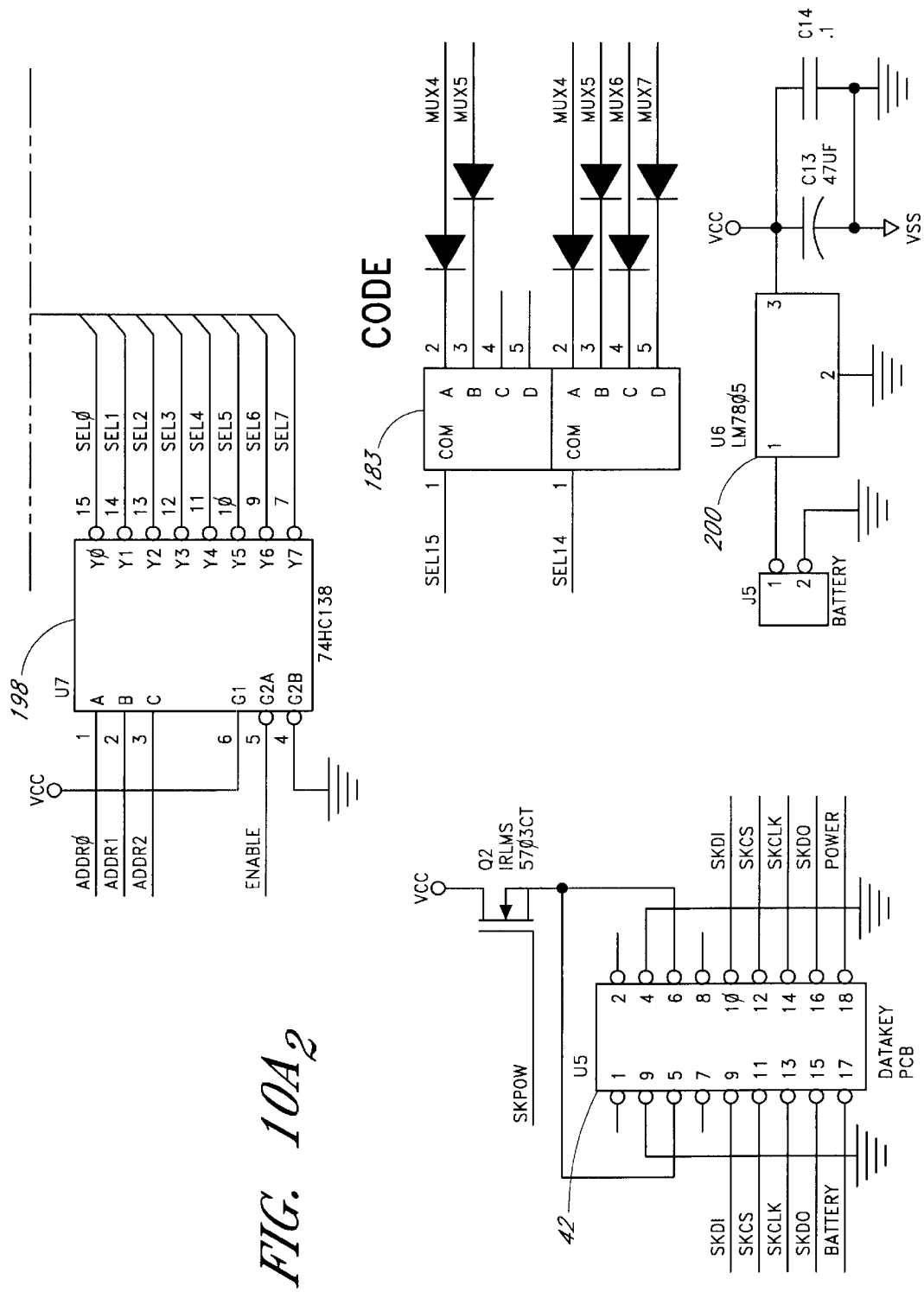
FIG. 10A2

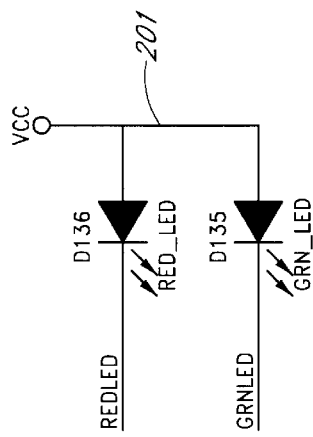
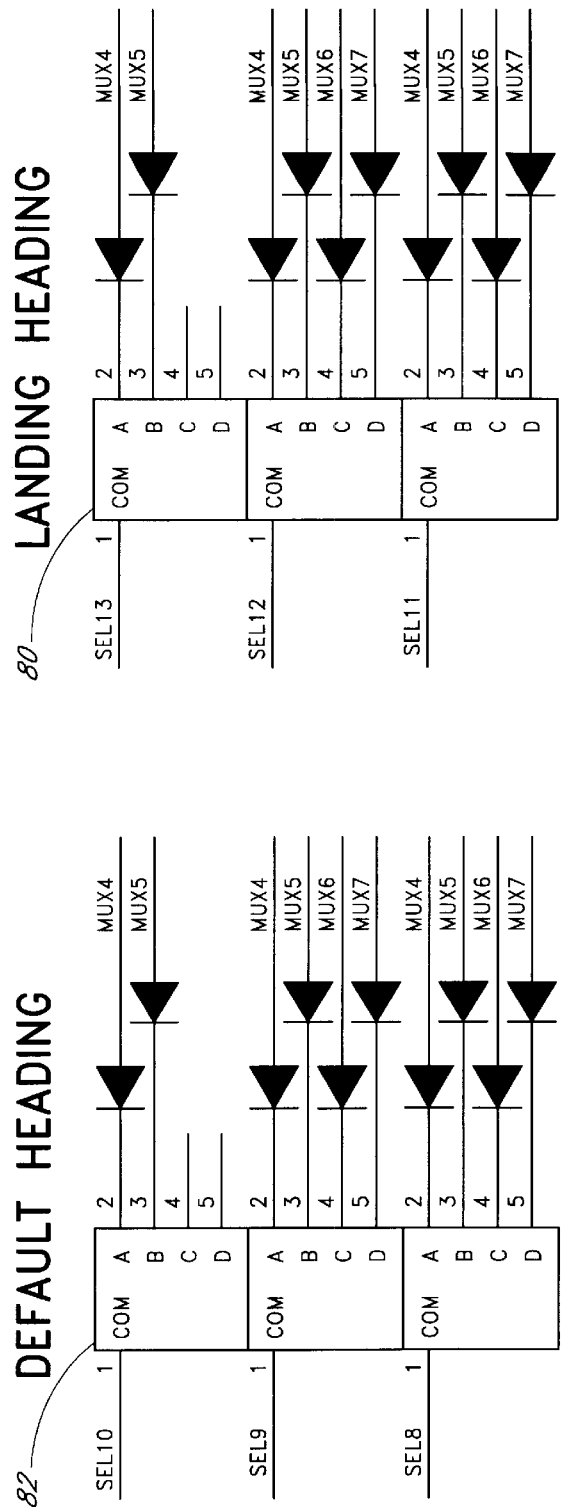
FIG. 10A3

| FIG. 10B₁ | FIG. 10B₂ | FIG. 10B₃ |

*FIG. 10B*

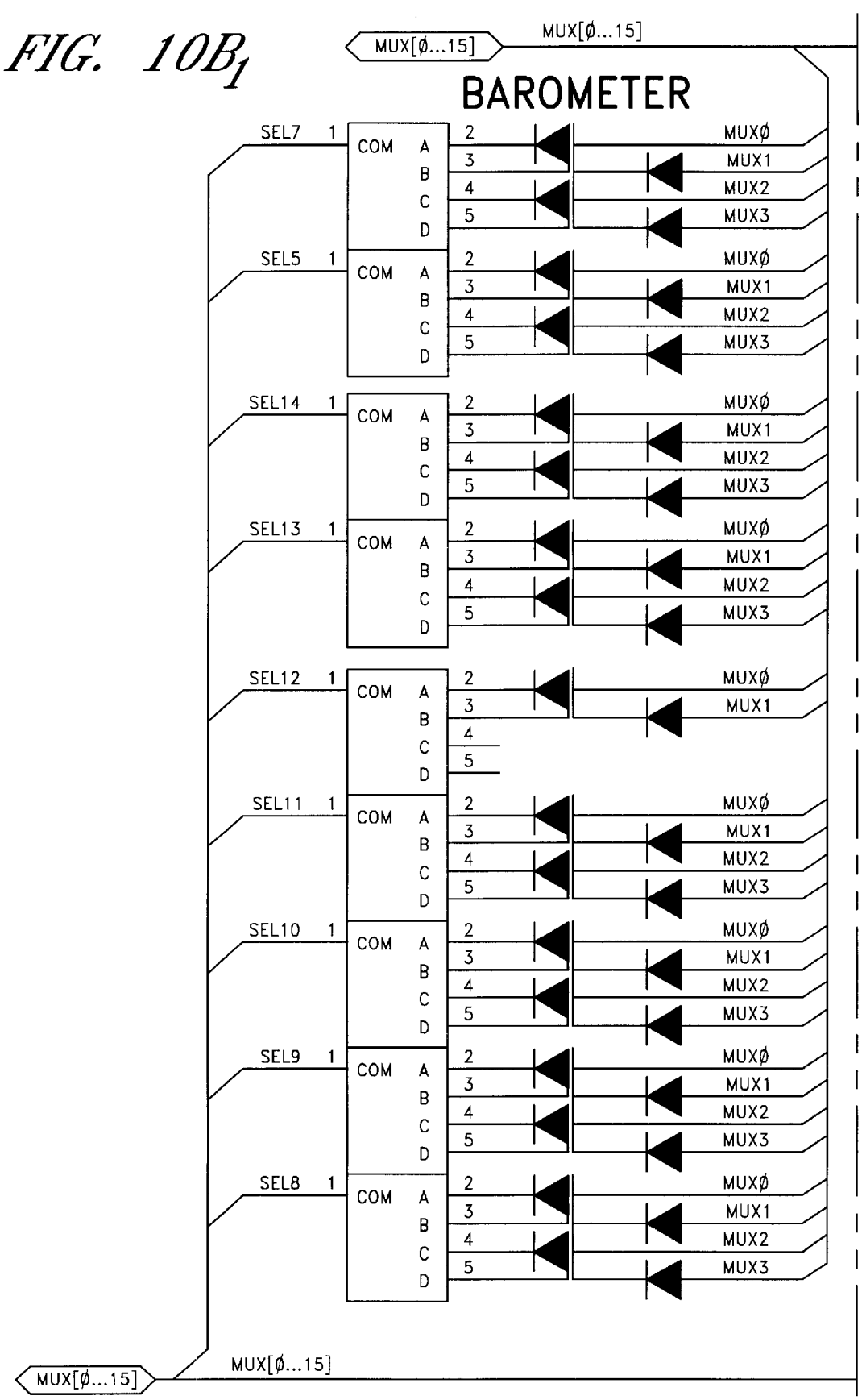
FIG. 10B₁

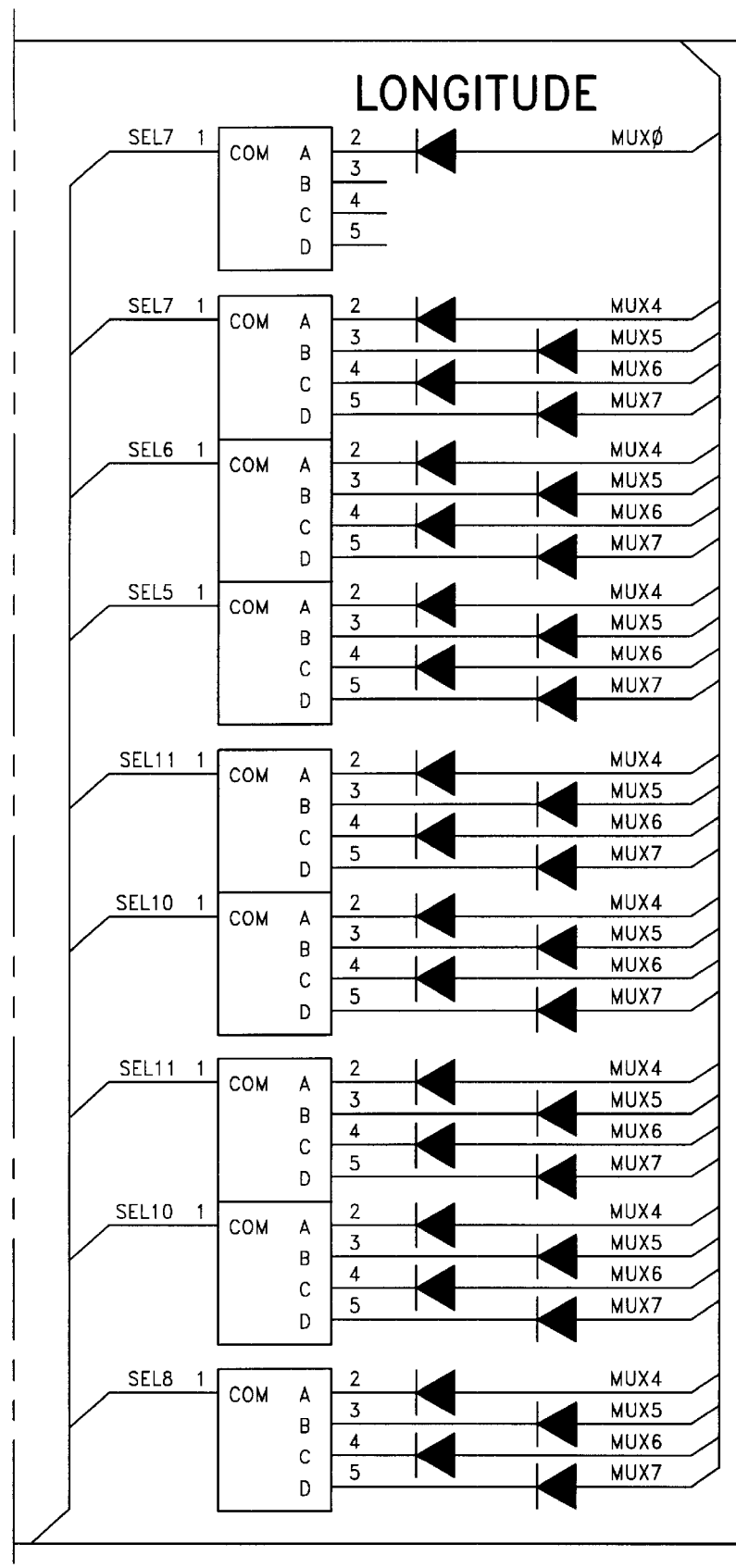
FIG. 10B₂

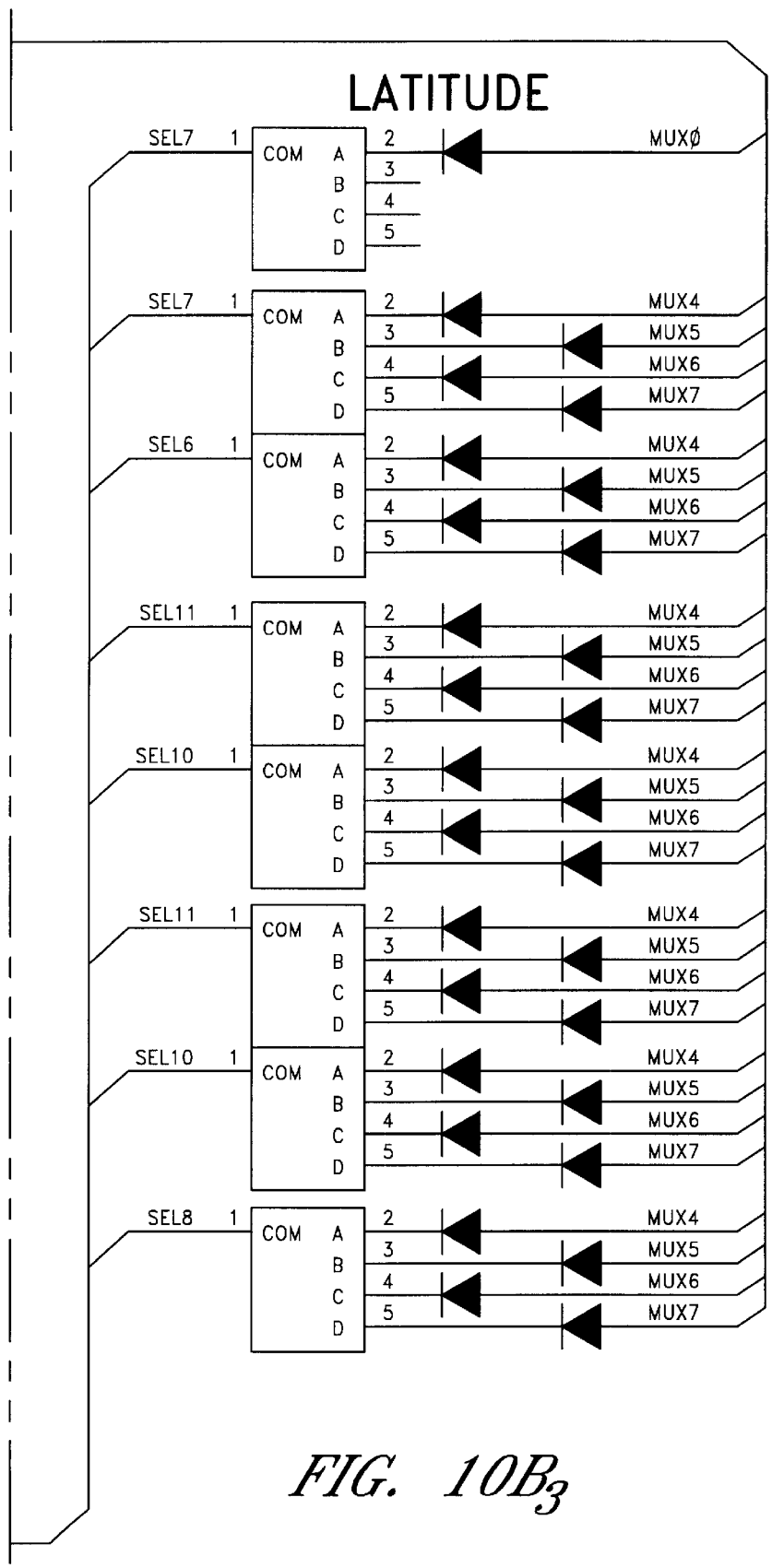
FIG. 10B₃

AUTOMATIC GUIDANCE UNIT FOR AERIAL DELIVERY UNIT

This application claims the benefit of U.S. Provisional Application No. 60/226,423 filed Aug. 18, 2000 entitled "Automatic Guidance Unit For Aerial Delivery Unit."

FIELD OF THE INVENTION

This invention relates to automatically controlled aerial delivery systems and methods and apparatus for programming the automatic guidance unit of such aerial delivery systems.

BACKGROUND OF THE INVENTION

Automatically guided ram air parafoil parachutes are excellent vehicles for delivery of cargoes from airplanes in situations when weather, terrain or military conflict makes aircraft landing difficult or impossible. One such airborne parafoil vehicle is the PEGASUS Advanced Precision Delivery System (APADS) available from FXC Corporation, the assignee of the present invention.

SUMMARY OF THE INVENTION

Prior to deploying a guided parachute system from an airplane, the on-board guidance system is preprogrammed with the target information. Heretofore, the complexity and difficulty of programming this on-board guidance system has greatly inhibited the use of automatically guided parafoil canopies or parachutes. Even though the ram air parafoil is capable of very accurately reaching targets from 30,000 feet aloft and several miles away from the target location, even a small error in preprogramming the airborne guidance system can completely negate the mission by causing the delivery system to land miles away from the targeted location.

The preferred embodiments of the present invention employ a simple handheld programming unit into which the coordinates and other parameters of the target location are set by simple thumbwheel switches. This programming can be quickly and accurately performed in the field by someone completely lacking in computer training or computer skills.

The preferred embodiments of the hand-held programming unit include a key receptacle accessible from outside of the unit. This receptacle accepts a key having an integral EEPROM or other data memory, which when inserted into this receptacle is loaded with the target location data that the user has manually entered into the handheld unit using the thumbwheel switches.

The memory key, now loaded with the target information, is easily carried by a responsible person for arming the guidance system. At the appropriate time before deployment of the load, this memory key is inserted into a mating receptacle located on the airborne guidance unit. The airborne unit is then immediately armed with the geographic coordinates and other data necessary for preprogramming the onboard flight guidance computer.

A significant feature of the programming system and procedure is its ease of use and minimal training requirements. No step requires the user to be trained in computers or the use of any computer operating or application software. As a result, the opportunity for making mistakes in the field is greatly decreased. Moreover, preloading the program data is very simple and straight forward and can be easily and quickly performed whether the parachute and guidance system are still on the ground waiting to be loaded into the airplane or after the unit has been loaded within the airplane. In addition, the programming of the memory key can be performed at any convenient time and by a different person than the personnel involved in deploying the guided parachute from the airplane.

BRIEF DESCRIPTION OF THE DRAWINGS

FIG. 5 is a perspective view of one embodiment of a hand-held programming unit;

FIGS. 10a and 10b show exemplary circuitry for the hand-held programming unit.

DETAILED DESCRIPTION OF THE PREFERRED EMBODIMENT

Figure 1A:
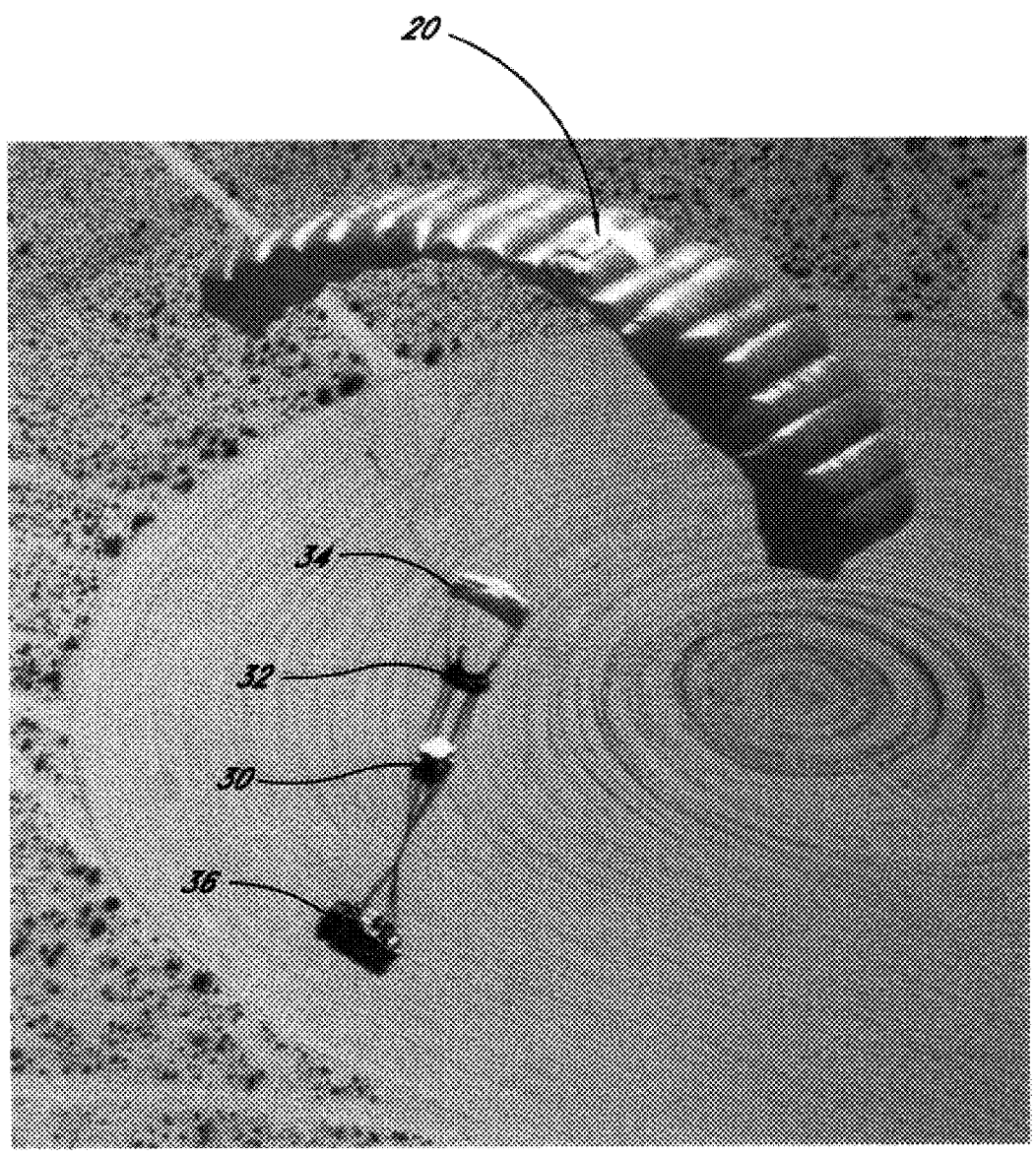
FIGS. 1A and 1B show a cargo carrying ram air parafoil canopy in flight after it has been deployed from an airplane.
Figure 1B:
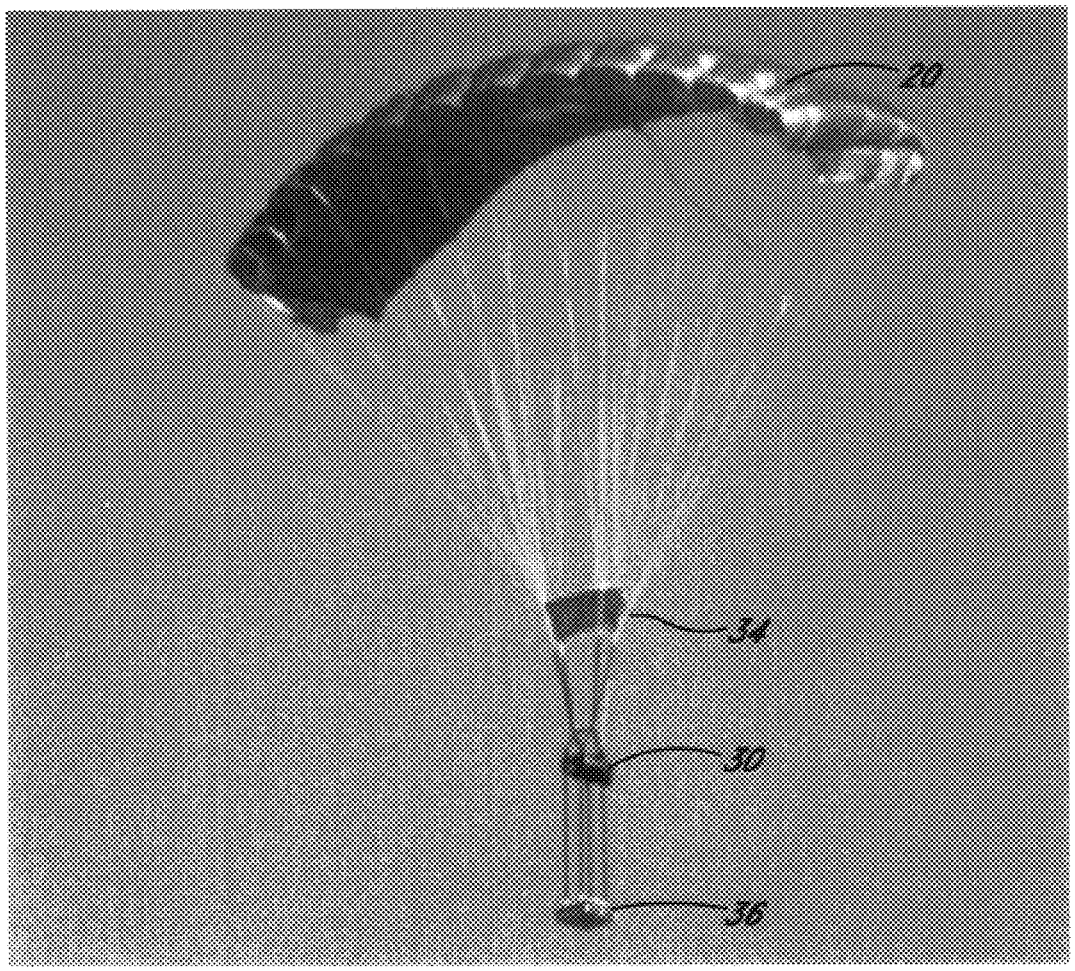

Exemplary ram air parafoil canopy 20 and 20' are illustrated in FIGS. 1A and 1B. Such parafoil canopies are used to deliver payloads from airplanes flying at high altitudes. Canopies manufactured by FXC Corporation, assignee of the present invention, have glide ratios in excess of 4.5:1. Reefed deployment allows these ram air parafoil canopies to be dropped at speeds up to 200 knots indicated airspeed (KIAS) from altitudes of 30,000 feet mean sea level (MSL) with reliability. Typically, canopy 20, 20' includes a plurality of suspension lines attached directly to the canopy and then extending downwardly and inwardly. Suspended from the suspension lines are a restraining device 34 for controlling the rate of inflation of the canopy 20, 20' and the airborne guidance unit (AGU) 30 to control the flight path to the canopy 20, 20'. The embodiment shown in FIG. 1A also shows the parachute bag 32, whereas in the embodiment of FIG. 1B, this bag is retained proximate to the underside of canopy 20' and is therefore not visible in FIG. 1B. Right and left risers are controlled by servomotors located within the AGU 30. The load 36 is carried below the AGU 30.

Figure 2:
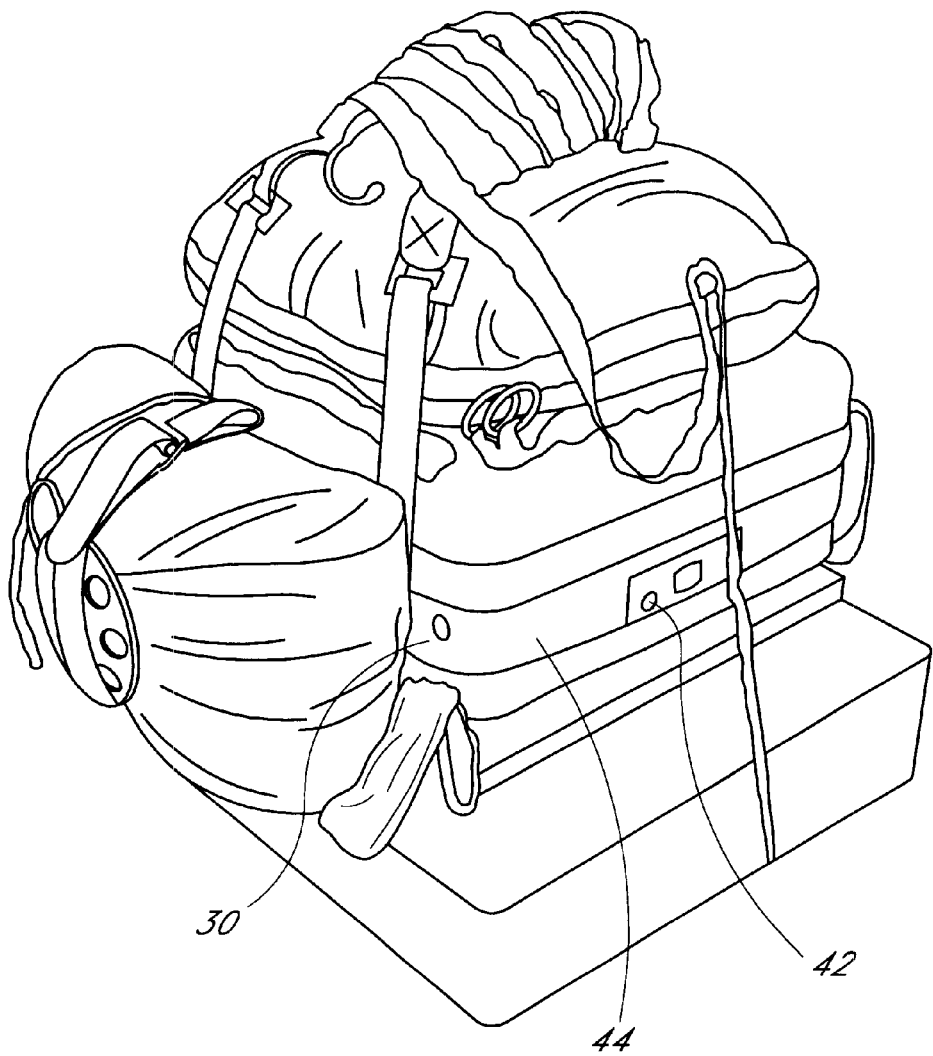
FIG. 2 shows the ram air parafoil canopy with an automatic guidance unit as it is packed before loading onto an airplane.

The airborne elements of FIGS. 1A and 1B including the parafoil canopy 20, 20' and AGU 30 within a case 44 are shown in FIG. 2 in their packed state before being deployed from an airplane.

Figure 4A:
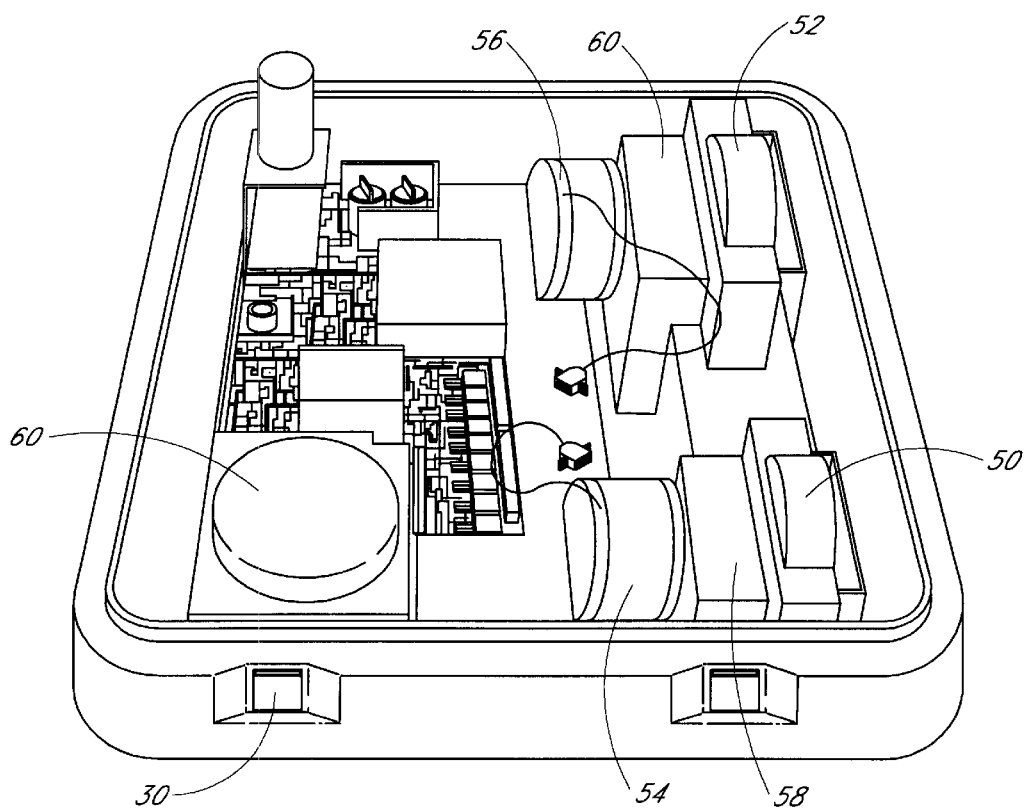
FIG. 4A shows a top plan view of one embodiment of the automatic guidance unit.
Figure 4B:
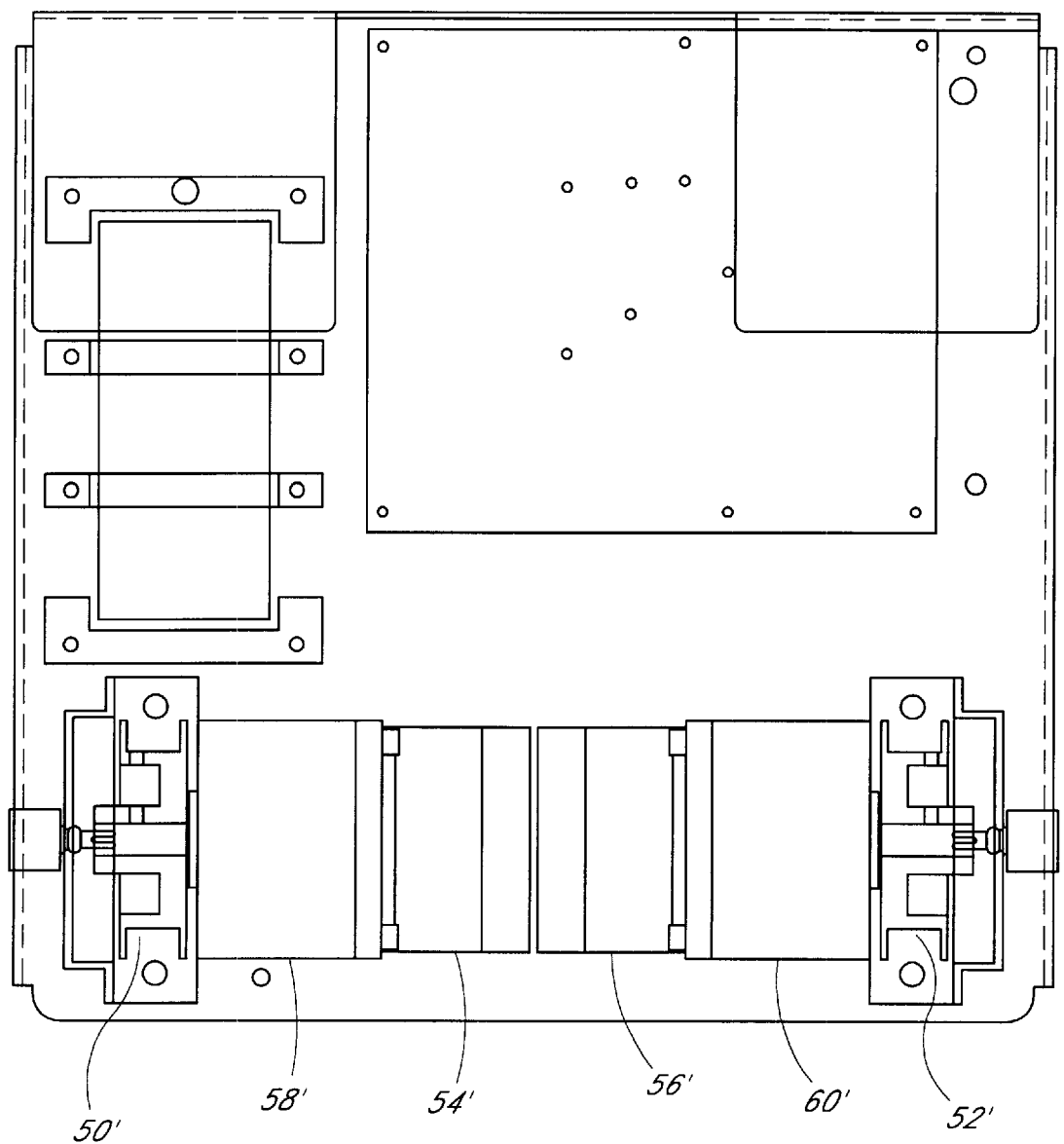
FIG. 4B shows a top plan view of a modified servomotor-pulley arrangement.

The preferred embodiments of the AGU include servo controls for rotating two pulleys respectively coupled by gear trains to stepper motors. In one embodiment of the AGU unit 30 shown in FIG. 4(A), the right and left risers are respectively attached to control lines wound around pulleys 50 and 52. Respective stepper motors 54 and 56 are coupled through respective gear boxes 58 and 60 to drive pulleys 50, 52. FIG. 4B illustrates an alternative embodiment in which the pulleys 50' and 52' are shown in cross-section with pulleys 50', 52' stepper motors 54', 56' and gear boxes 58', 60' disposed in line along a common axis.

Figure 4C:
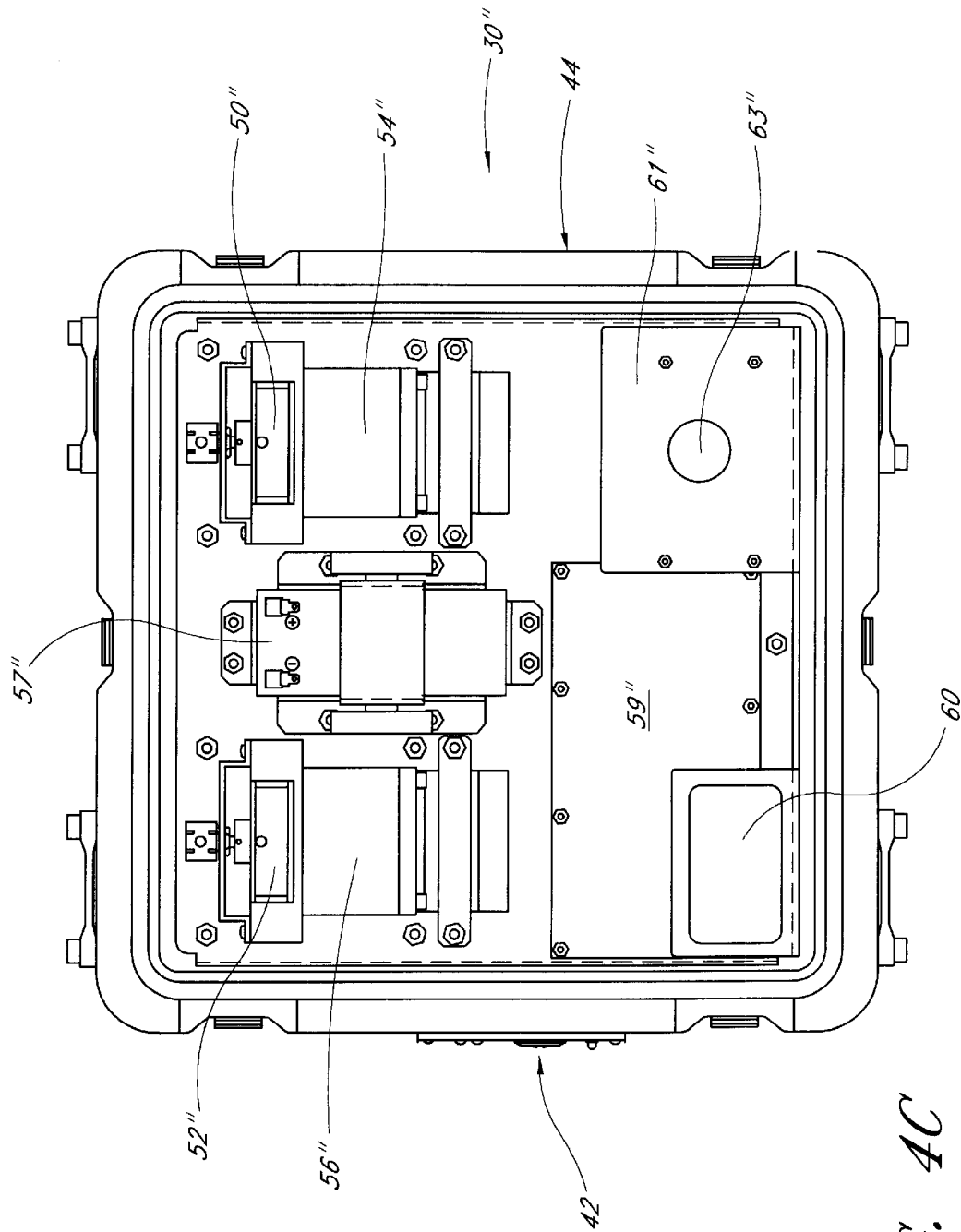
FIG. 4C shows a top plan view of another embodiment of the automatic guidance unit.
Figure 4D:
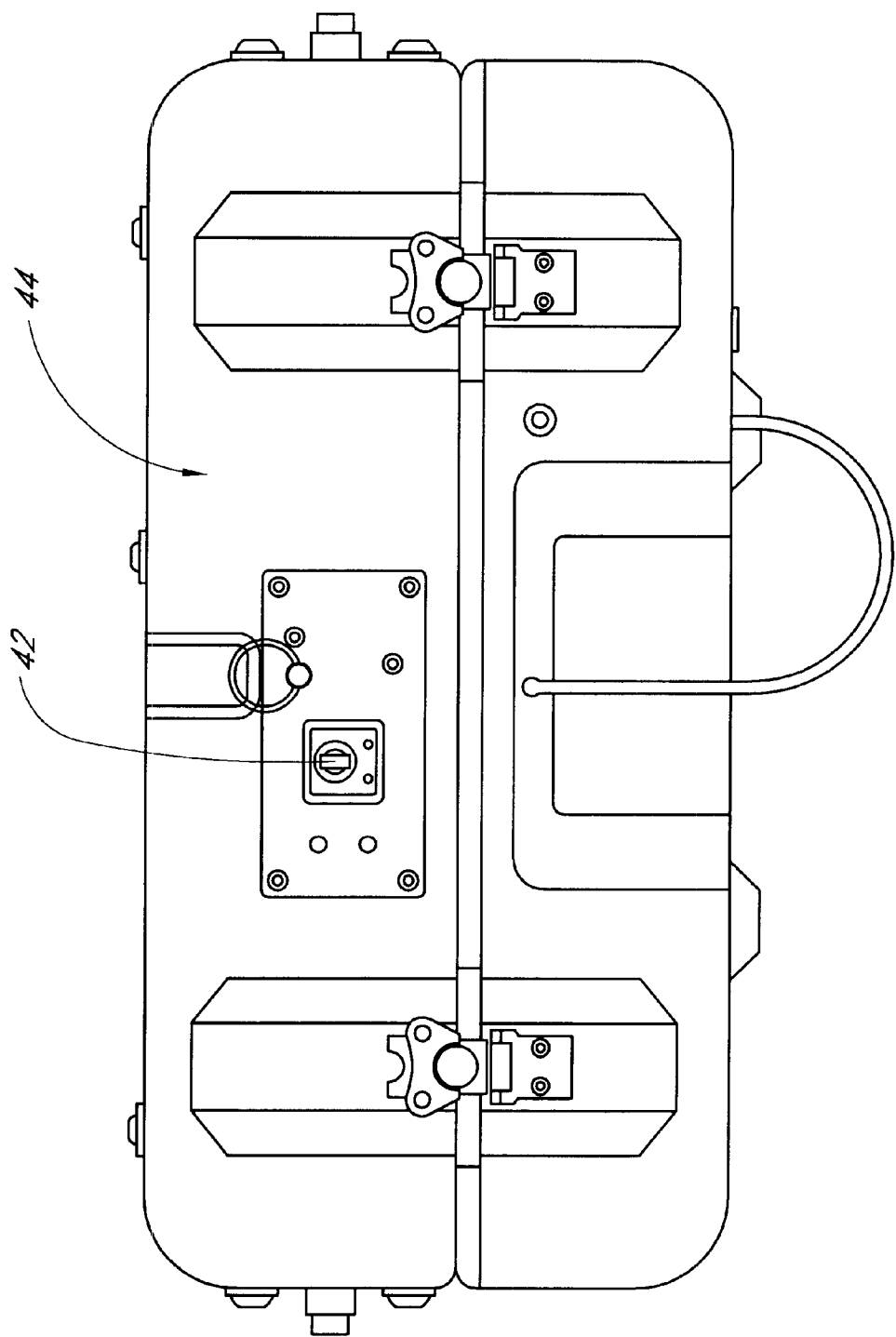
FIG. 4D shows a side elevational view of the automatic guidance unit of FIG. 4c.

Another preferred embodiment of the airborne guidance unit (AGU) 30" is shown in FIGS. 4C and 4D. Stepper servomotors 54" and 56" are connected to respective pulleys 50", 52" around which are wound the lines controlling the parafoil canopy. Power is supplied to the onboard control circuitry and servomotor by a battery 57". Typically, this battery is a 12-volt battery. The onboard control circuitry is mounted on a circuit board 59". An onboard transceiver 61" and antenna 63" provides a wireless datalink to ground. GPS receiver 60 supplies latitude, longitude and altitude information to the onboard AGU digital flight computer.

By way of one specific example, approximately 30 inches of control line is wrapped around each of the pulleys 50, 52, the gear boxes have an 18 to 1 ratio and the servo actuator stepper motors 54, 56 are driven at a 5,000 Hz rate so that the control lines are moved in and out from the pulleys 50, 52 at approximately one foot of control line per second.

The AGU's 30, 30' and 30" advantageously include a digital flight computer (typically several microprocessors and associated memory), a GPS receiver 60, an altitude sensor, a compass, a power supply and batteries. An air speed sensor can also be included. The digital flight computer processes information from the GPS receiver 60 and other airborne sensors to determine the trajectory to intercept and land the canopy 20 while conserving altitude and compensating for wind variations. On example of a flight computer program is that utilized in the PEGASUS APADS aerial delivery system manufactured by FXC Corporation, assignee of the present invention.

Figure 3A:
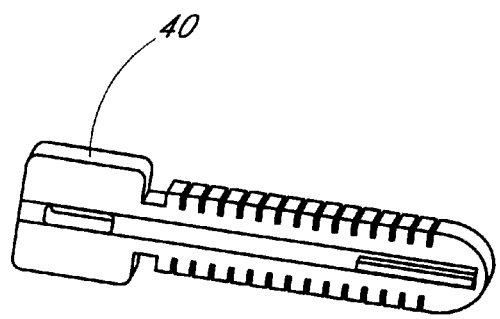
FIG. 3A shows a programmable memory key for programming the automatic guidance unit.
Figure 3B:
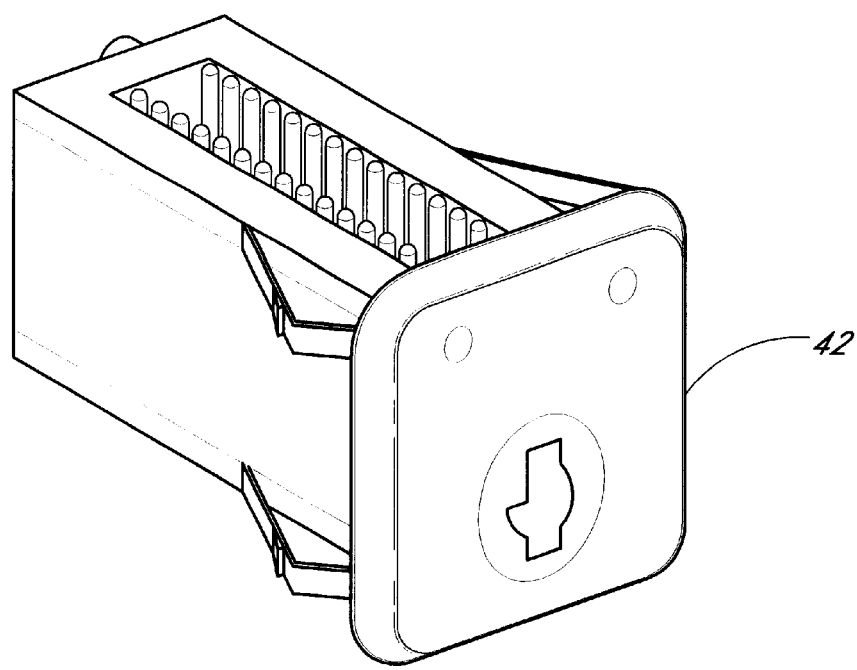
FIG. 3B shows the female receptacle used in the automatic guidance unit and the hand-held programmer unit for receiving the programmable memory key.

Prior to deployment of the parafoil 20 and its load 36 from the airplane, the digital flight computer must be preprogrammed. Typically data input includes the geographical coordinates of the desired landing location, the anticipated landing heading, the altitude of the landing site and the barometric pressure. As described below, significant feature of this invention is that the AGU's 30, 30' and 30" are very simply and easily pre-programmed before deployment by entering a memory key 40 (shown in FIG. 3) into a mating female receptacle 42 accessible at the outside of the case 44 which contains the AGU.

Figure 6:
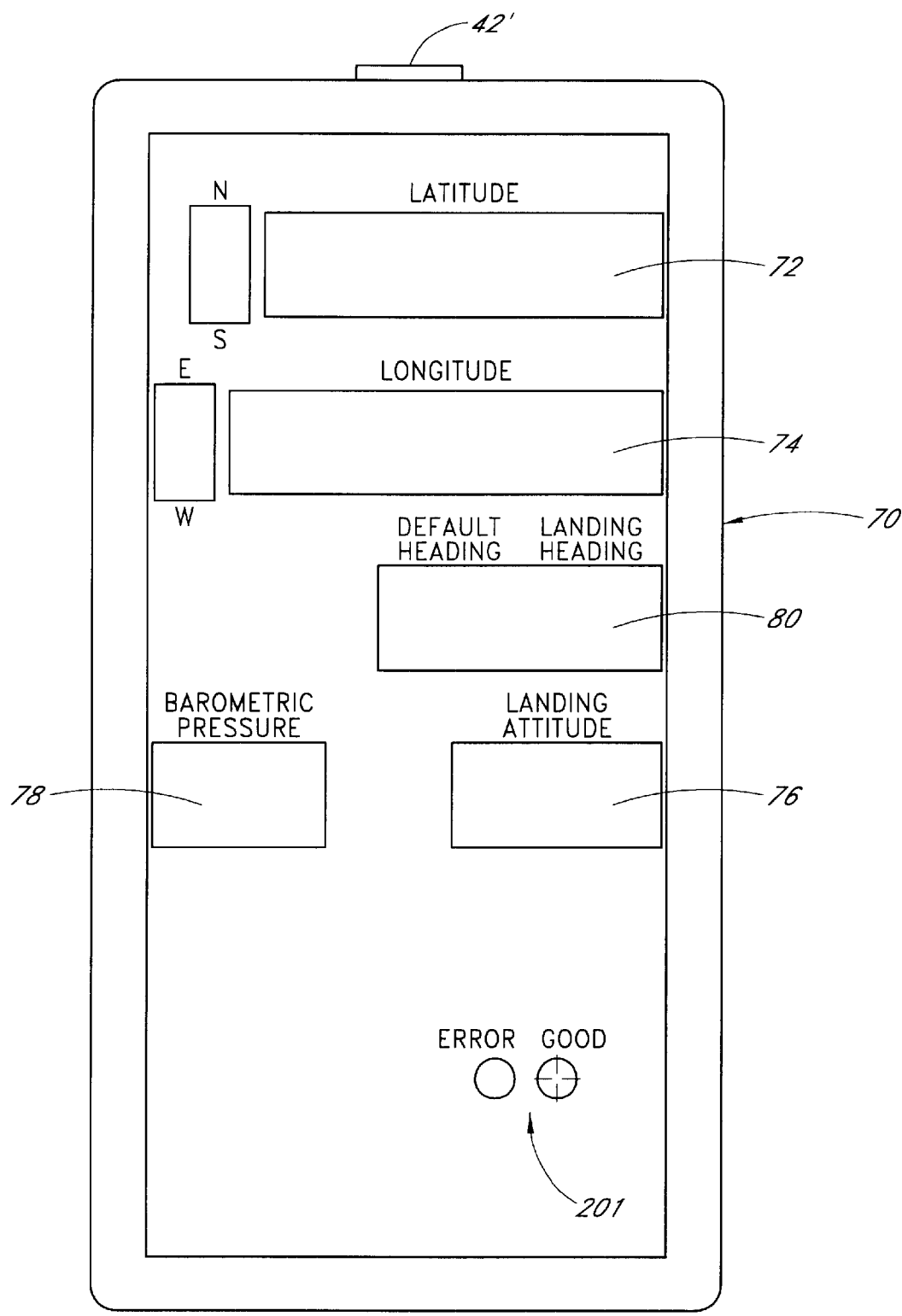
FIG. 6 is a top view of the unit of FIG. 5.
Figure 7:
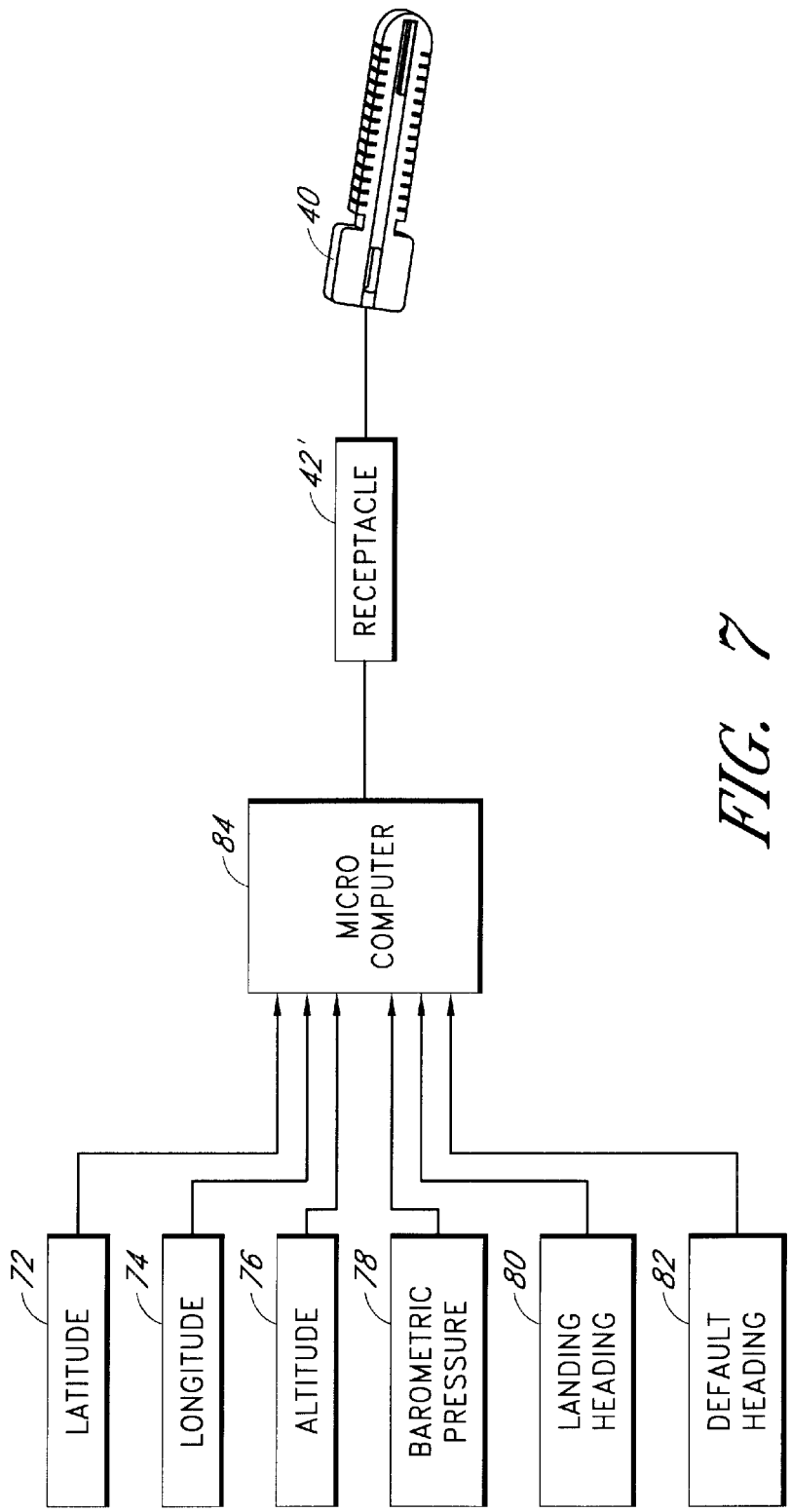
FIG. 7 is a block diagram of the hand-held programmer of FIGS. 5 and 6.

The preferred embodiments of this invention provide a hand-held programming unit. Preferred embodiments 70 and 170 of this hand-held unit are shown in FIGS. 5, 6, 7, 8, and 9. In the embodiments of FIGS. 5, 6, and 7, the latitude, longitude, landing altitude, barometric pressure, landing heading and default heading information relating to the desired landing location is entered by respective thumbwheel switches 72, 74, 76, 78, 80 and 82 or like devices into a microcomputer 84 located within the handheld unit.

Figure 8:
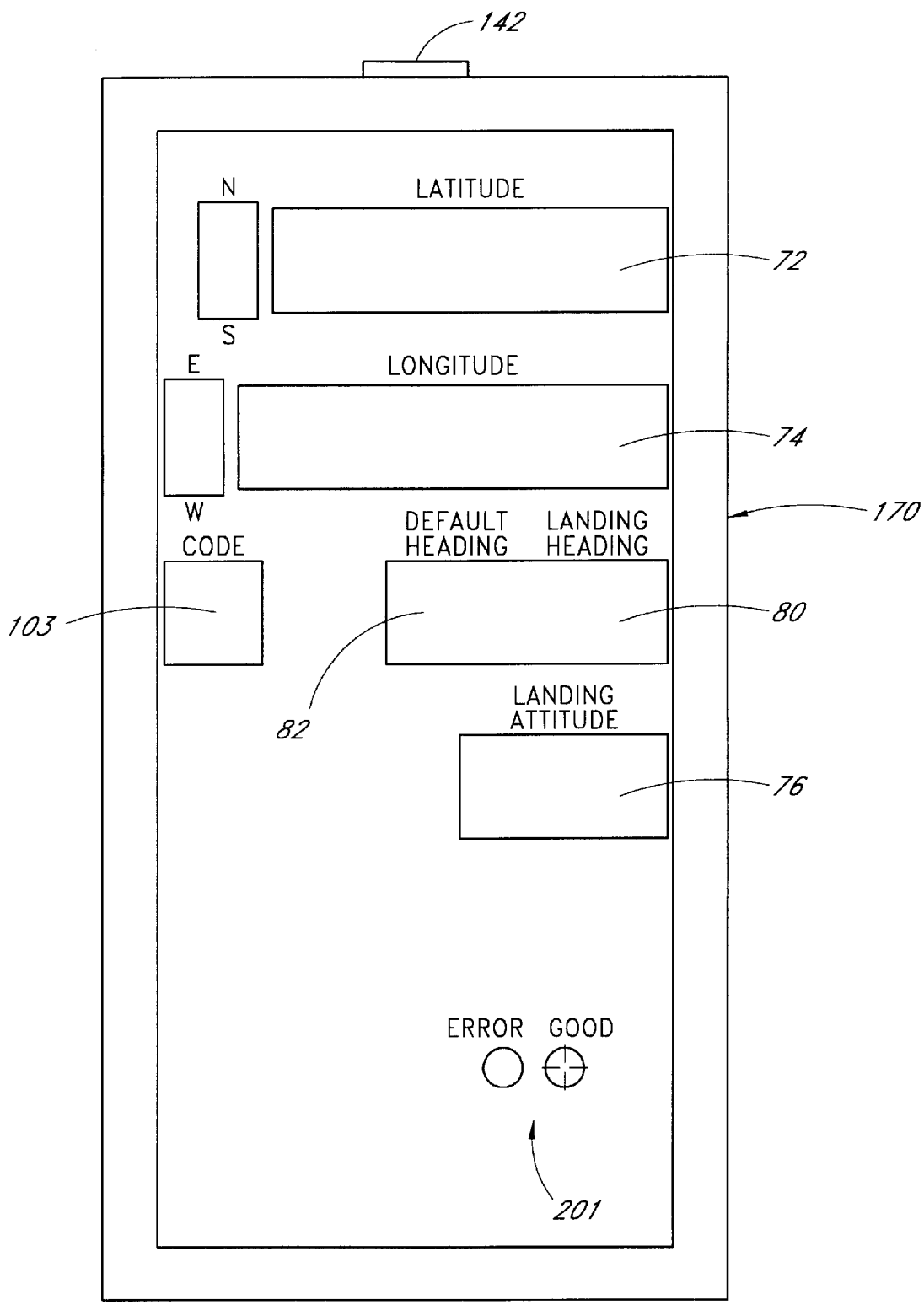
FIG. 8 is a top view of another embodiment of the hand-held programming unit.
Figure 9:
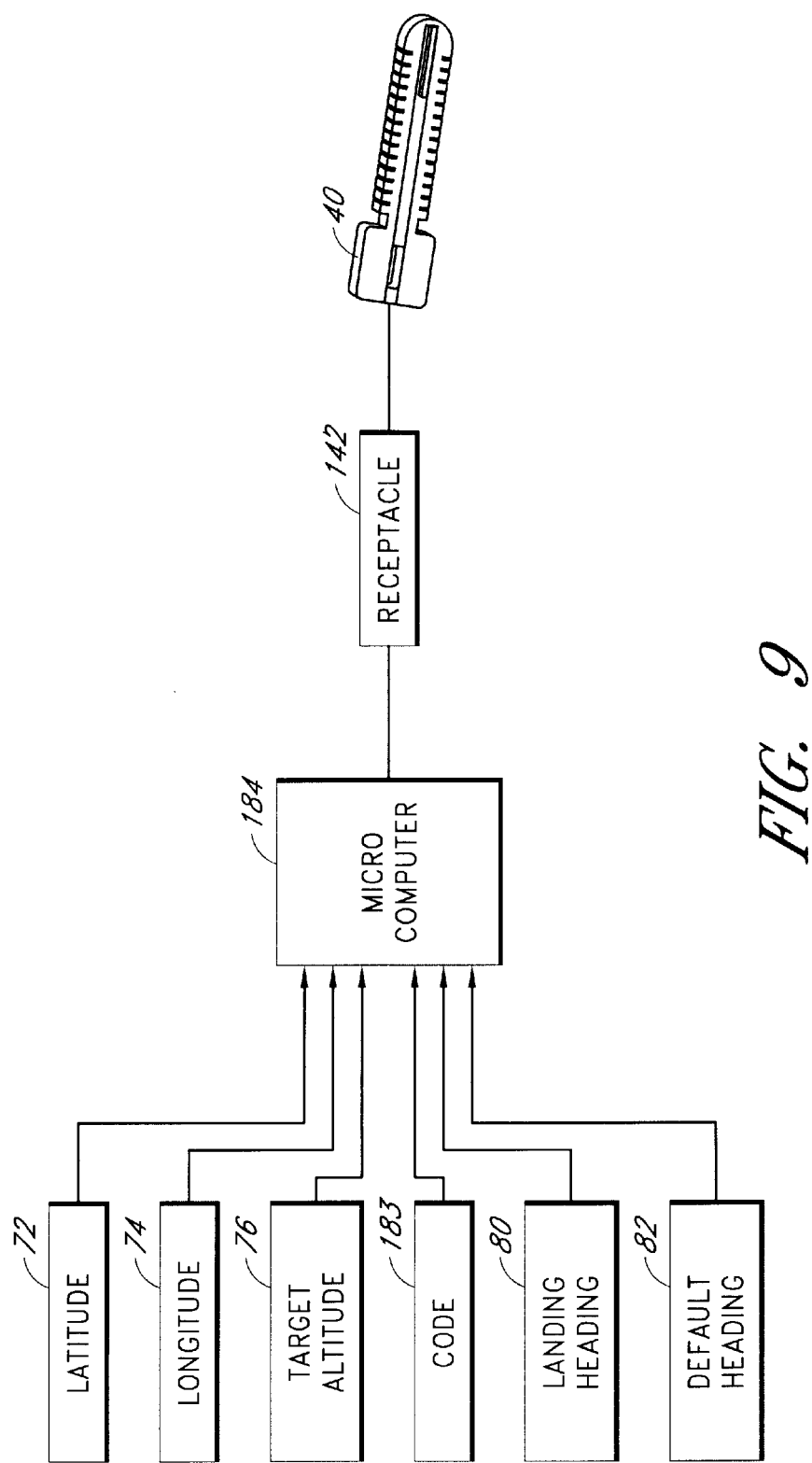
FIG. 9 is a block diagram of the hand-held programmer of FIG. 8.

In the hand-held unit 170 shown in FIGS. 8 and 9, the thumbwheel switch for entering barometric pressure is not required since accurate altitude information is provided by the global positioning system (GPS) 60 onboard the AGU. Therefore, unit 170 includes respective thumbwheel switches 72, 74, 76, 80, and 82 or the like, respectively entering the latitude, longitude, landing altitude, landing heading, and default heading information relating to the desired landing location. In addition, AGU unit 170 advantageously includes a code selector switch 183 for encoding the programmable key 40 with a particular code number recognizable by the AGU. These manually entered values are supplied as inputs to the microprocessor computer 84. Key 40 is inserted into receptacle 142 and the data stored in the computer 84 is read into the EEPROM memory located within key 40. LED readants 201, 202 indicate that the data has been stored in key 40.

Figure 10A:
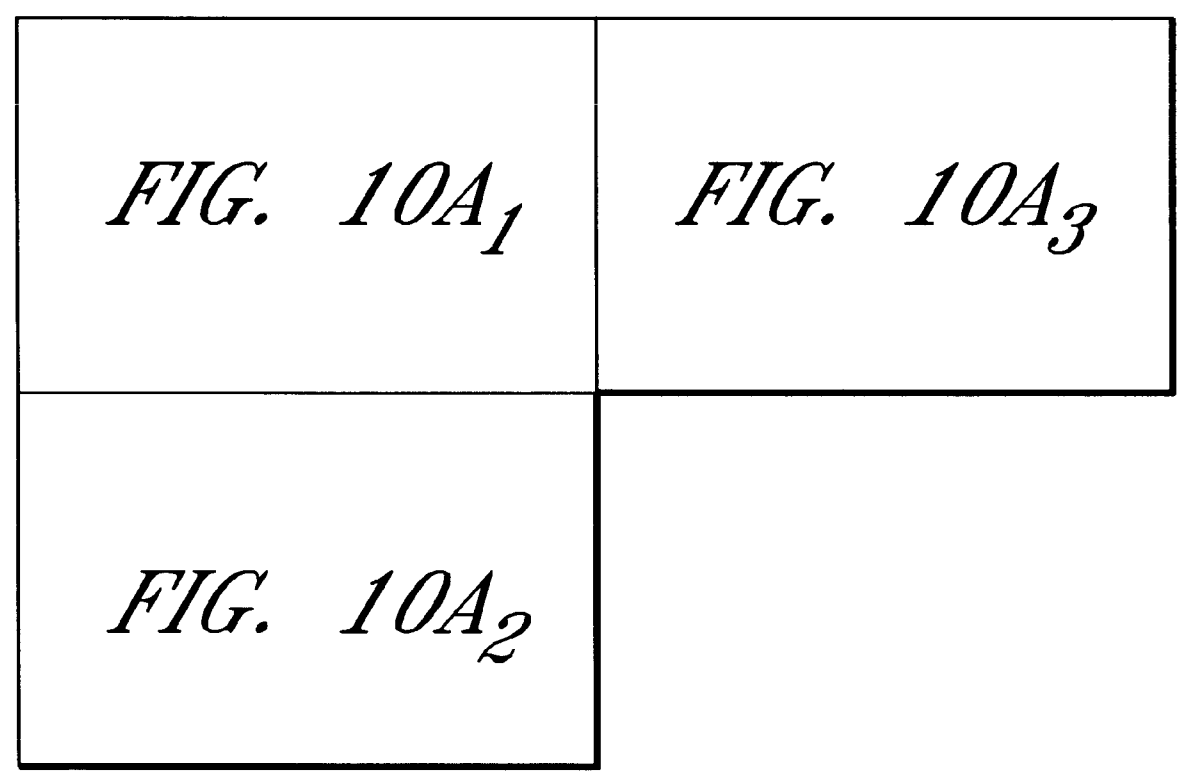
Figure 10B:
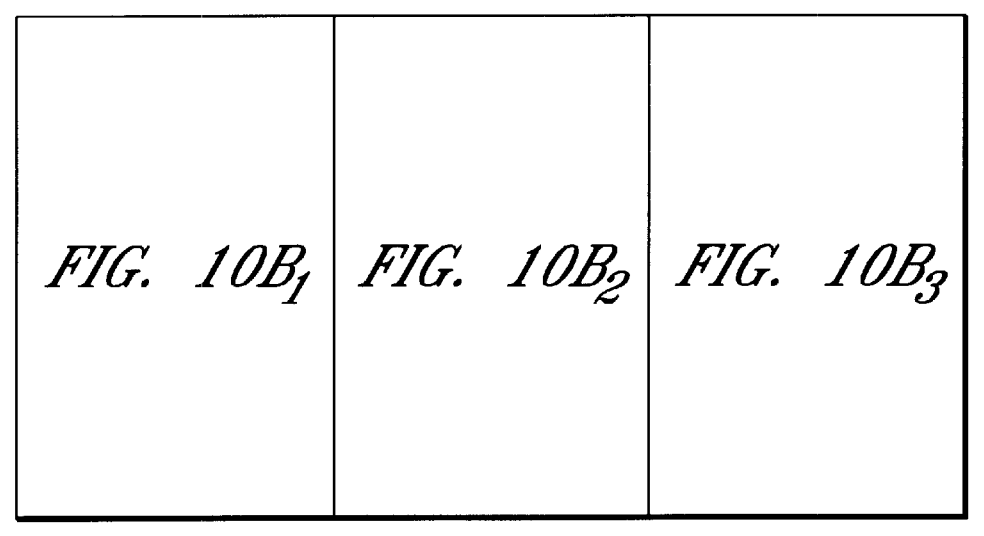

Exemplary internal circuitry of the hand-held unit 70 and 170 is illustrated in FIGS. 10a and 10b. Thumbwheel switches 80 and 82 are shown in FIG. 10a and thumbwheel switches 72, 74, 76, and 78 are shown in FIG. 10b. FIG. 10a further illustrates code switch 183 of AGU 170. It will be understood that since the barometer switch 78 is eliminated in the AGU 170, the switch 78 and its associated diode array shown in FIG. 10b need not be included in AGU 170.

Buses connect each switch directly to microprocessor 84 or via decoder 198. Computer 84 addresses each switch and enters the data into the programmable key inserted into receptacle 42. Also shown in the schematic of FIG. 10a are a 5-watt regulating power supply 200 and LED readants 201, 202.

Advantageously, key 40 is a flash EEPROM memory key such as those described in U.S. Pat. No. 4,578,573 and available from Datakey, Inc., Burnsville, Mich. 55337 (www.datakey.com). Key receptacles 42 in the handheld unit 70 and key receptacle 142 in the hand-held unit 170 accept the key 40 and transfers the data inputted into the memory within the microcomputer 84 into the EEPROM memory located within the key 40.

At any convenient time, before or during flight the key 40 is inserted into a mating receptacle 42 on the AGU case 44 (See FIGS. 2 and 4d) to arm the AGU. Turning the key 40 in receptacle 42 causes the data stored on key 40 to be read into the memory of the microprocessor within the AGU 30. An indicator lamp 46 is then caused to intermittently flash indicating that the memory data has been transferred from key 40 and stored in the AGU 30.

The handheld data entry units 70, 170 and key 40 are significant improvements in perfecting load carrying parafoil canopies. Heretofore, the flight data was programmed on a lap top computer and required the user to be knowledgeable in the use of a computer keyboard and using computer application and operating software such as, for example, the MS-DOS or Window computer operating systems. Mistakes in entry of data often resulted in the cargo never reaching its desired target. In warfare or disaster situations, such errors can be catastrophic since the cargo either may not reach the target area or fall into the hands of the enemy forces. In the field, repeated tests have proven that the use of a programmed laptop computer to preprogram the onboard AGU is not satisfactory. In contrast, the handheld unit 70 is easily and simply mastered and requires no computer knowledge or skills.

The preferred embodiments of the present invention include a power switch which limits the power drawn from the ACG battery until the canopy ACG and load pack shown in FIG. 2 are deployed form the airplane. Advantageously, the receptacle 42 and indicator lamp 46 and battery charger plug (not shown) are available for use without having to power up the servo amplifiers, servo motors and ACG sensors until the AGU is deployed from the airplane. At such time, the on-board ACG battery is connected to drive the flight control servos and control lines 26, 28, as described above.

Appendix A is a publication of FXC Corporation entitled "PEGASUS-500 APADS SYSTEM DESCRIPTION." Appendix B is a copy of a publication of the American Institute for Aeronautics and Astronautics entitled "Development of A High Glide, Autonomous Aerial Delivery System 'Pegasus 500

(APADS)'." Appendices A and B provide additional information about actual embodiments of the invention including test data from actual flight testing of these embodiments.

While the invention has been described herein with reference to certain preferred embodiments, these embodiments have been presented by way of example only, and not to limit the scope of the invention. Accordingly, the scope of the invention should be defined only in accordance with the claims that follow.

What is claimed is:

1. The method of preprogramming the flight computer of a guidance unit in an automatically controlled ram air parafoil aerial delivery system comprising:

storing the latitude, longitude, altitude, desired landing heading, and default landing heading of the targeted location of said aerial delivery system as digital data in the digital memory of a microprocessor located in a handheld unit;

transferring the digital data stored in said digital memory to a removable key having a data memory integral therewith; and removing said key from said handheld unit and inserting said key into a mating receptacle of said guidance unit to transfer data stored from said memory key into said flight computer.

2. The method of preprogramming the flight computer of an automatically controlled ram air parafoil aerial delivery system comprising:

storing the geographical coordinates of the targeted location of said aerial delivery system as digital data in the digital memory of a microprocessor located in a handheld unit;

loading data corresponding to said stored digital data in a removable device having a data memory integral therewith; and removing said removable device from said handheld unit and inserting said device into a mating receptacle of said guidance unit to transfer data stored from said removable device into said flight computer.

3. The method of preprogramming a flight computer for a guidance unit of an aerial delivery system comprising:

entering the location of the landing target of said aerial delivery system into a memory key at a location removed from said flight computer;

moving said memory key from said remote location to said flight computer; and using said memory key to preprogram said flight computer.

4. The method of claim 3, including causing a visible lamp to blink when said flight computer has been preprogrammed.

5. A system for preprogramming a flight computer for an automatically controlled ram air parafoil aerial delivery system comprising:

a handheld unit having a series of thumbwheel switches on which can be manually entered the latitude, longitude, altitude, desired landing heading, and default landing heading;

a microprocessor and associated computer memory within said handheld unit storing digital data which corresponds with the values manually entered using said thumbwheel switches;

a female memory key receptacle accessible on the outside of said handheld unit, such receptacle connected to said microprocessor and associated computer memory;

a memory key having an integral data memory insertable into said receptacle and storing in said integral memory data corresponding to said values manually entered using said thumbwheel switches; and a second female receptacle mating with said memory key, said second receptacle connected to the said flight computer.

6. A system for preprogramming a flight computer for an automatically controlled ram air parafoil aerial delivery system comprising:

a handheld unit having a series of thumbwheel switches on which can be manually entered the latitude, longitude, altitude, barometric pressure, and desired landing heading;

a microprocessor and associated computer memory within said handheld unit storing digital data which corresponds with the values manually entered using said thumbwheel switches;

a female memory key receptacle accessible on the outside of said handheld unit, such receptacle connected to said microprocessor and associated computer memory;

a memory key having an integral data memory insertable into said receptacle and storing in said integral memory data corresponding to said values manually entered using said thumbwheel switches; and a second female receptacle mating with said memory key, said second receptacle connected to the said flight computer.

7. A system for preprogramming a flight computer for an automatically controlled aerial delivery system comprising:

a unit within which the location and other parameters relating to a predetermined target location are manually entered, said unit including a computer memory storage of data corresponding to said manually entered parameters;

a first key receptacle coupled to said computer memory;

a data memory key insertable in said first key receptacle; and a second key receptacle which accepts said memory key, said second receptacle coupled to said flight computer.

8. The system of claim 7 wherein manually entered parameters indicate the altitude of the targeted location landing site.

9. The system of claim 7 wherein said manually entered parameters include the desired landing heading.

10. The system of claim 7 wherein said manually entered parameters include the default landing heading.

11. The system of claim 7 wherein said manually entered parameters include the barometric pressure.

12. The method of preprogramming a flight computer comprising:

storing in a computer memory digital data corresponding to the location of the targeted location;

inserting a removable key having a memory integral therewith into a first receptacle coupled to said computer memory;

loading digital data in the memory of said removable key corresponding to said digital data stored in said computer memory;

removing said removable key;

inserting said removable key into a second receptacle coupled to said flight computer; and transferring the digital data stored on said memory key to said flight computer.

* * * * *